T. F. BUCK.
SAFETY FENDER FOR AUTOMOBILES.
APPLICATION FILED MAY 5, 1922.
1,434,039.
Patented Oct. 31, 1922.
6 SHEETS—SHEET 1.
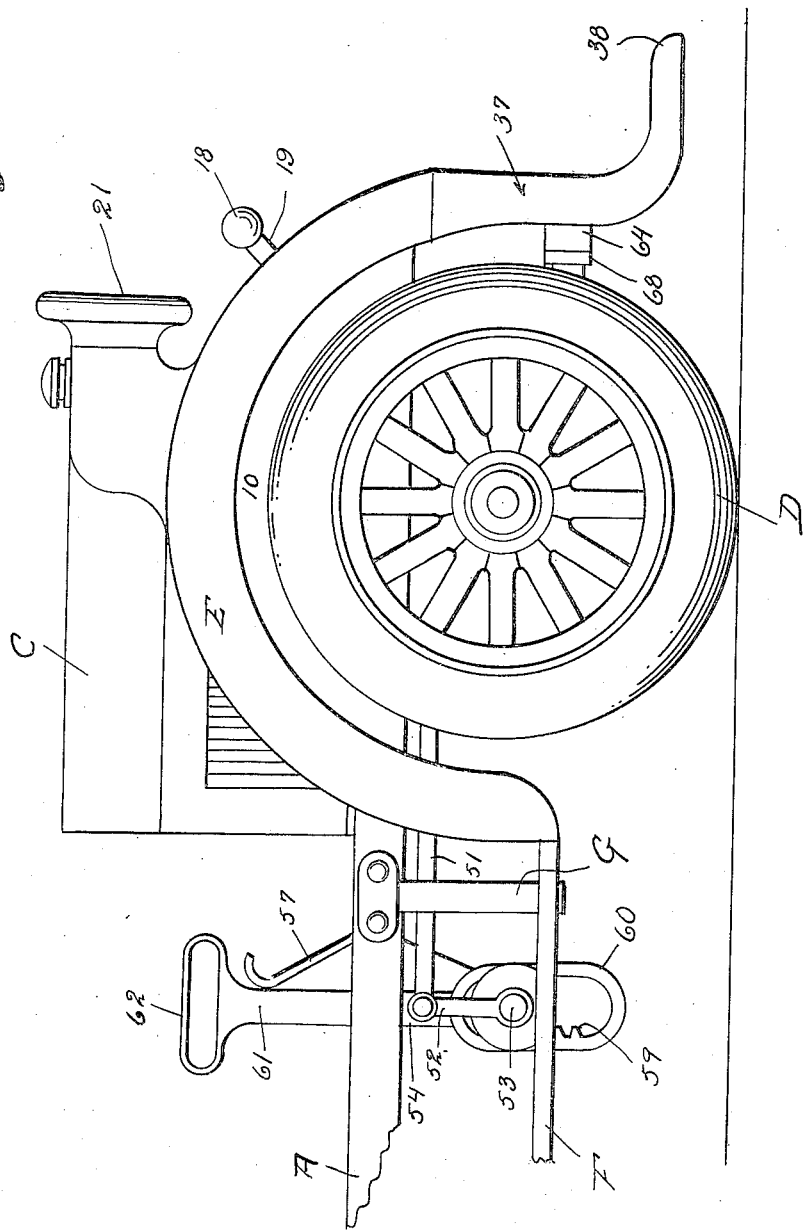
Witness
John Milton Jester
Inventor
Thomas F. Buck
By D. A. Gowrick
Attorney

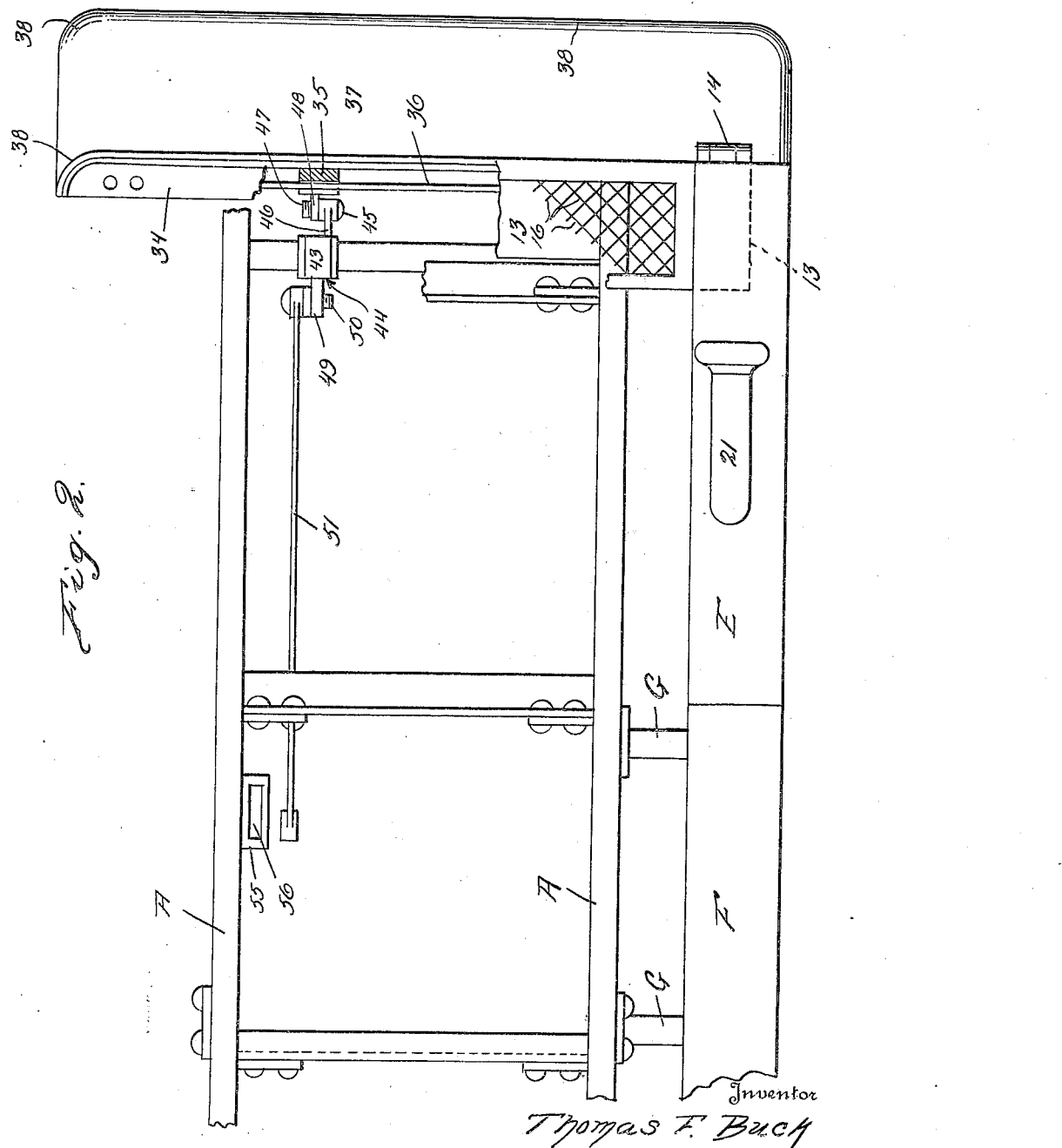

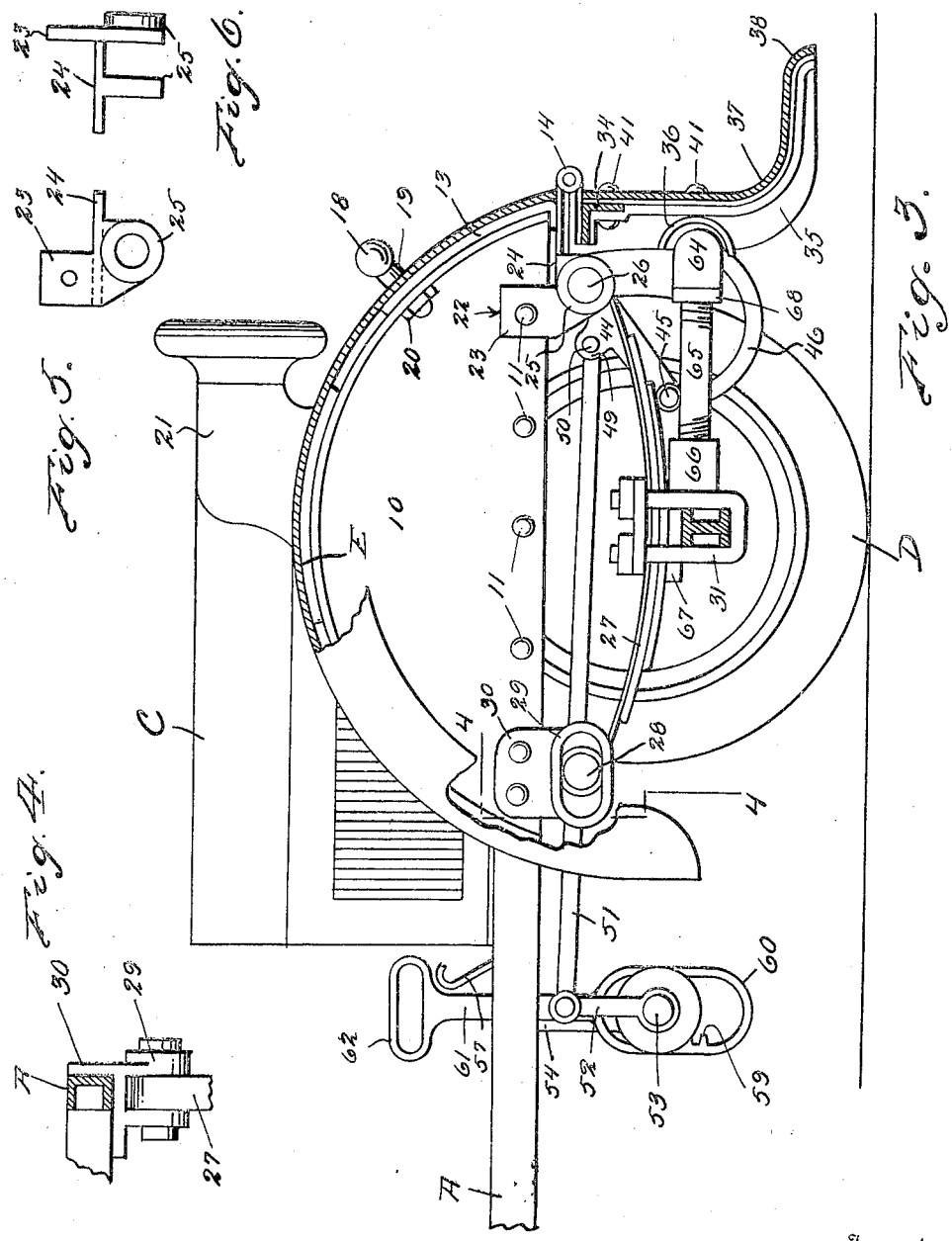

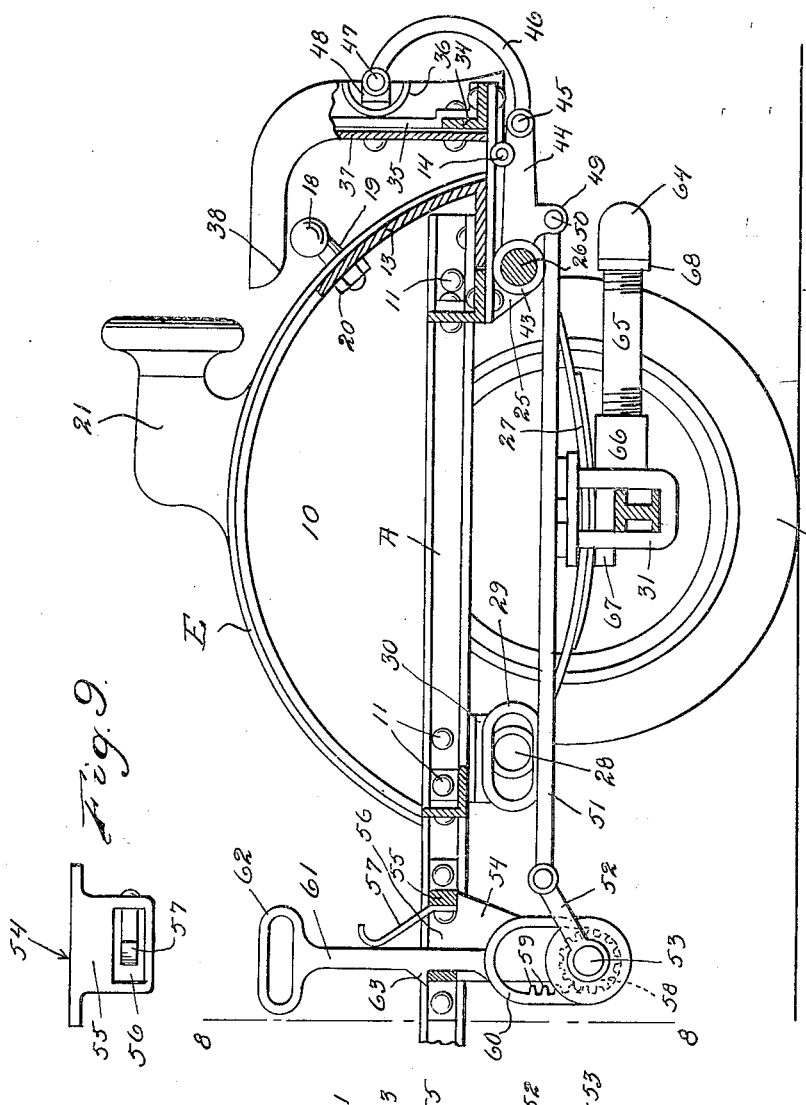

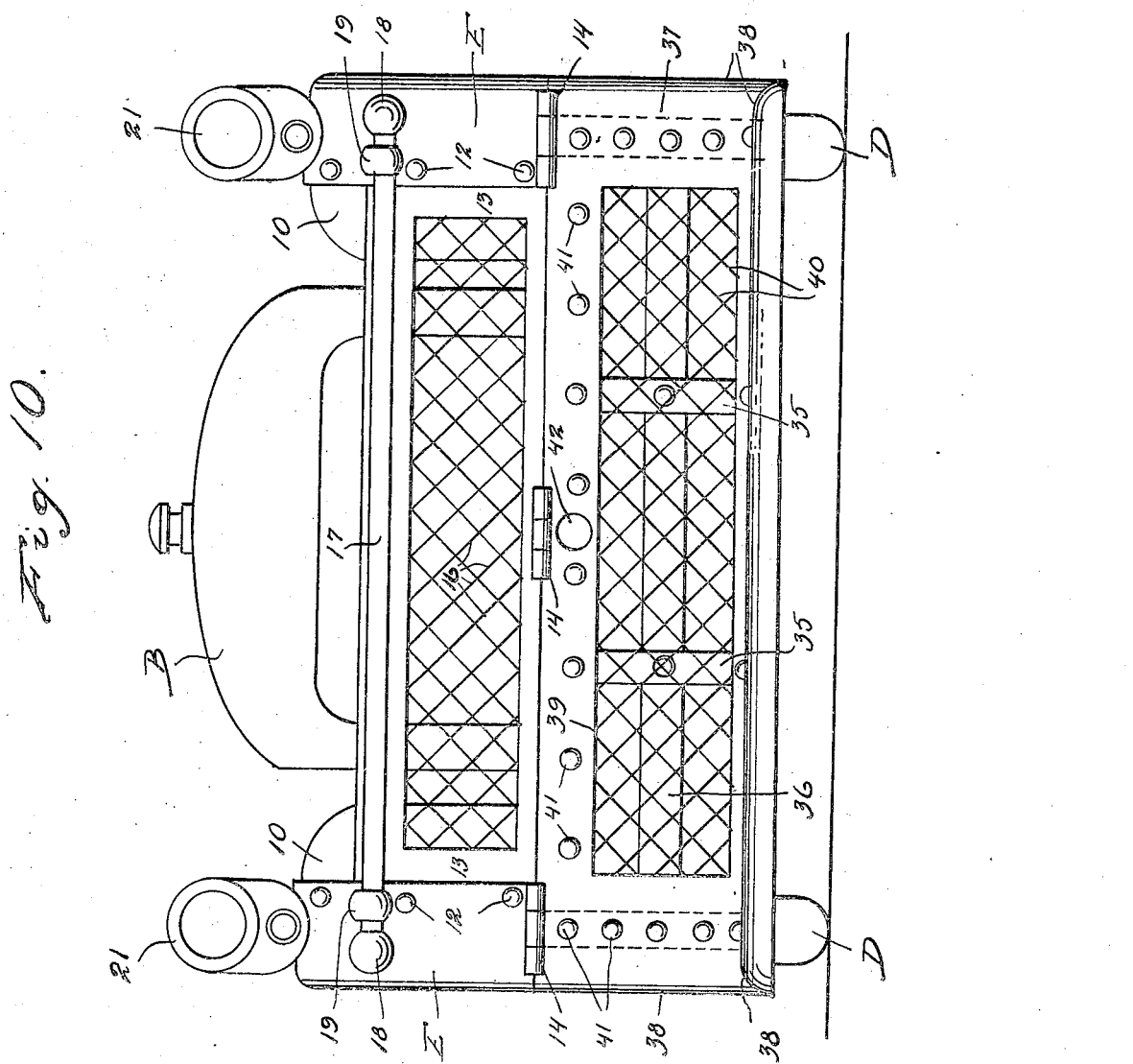

Patented Oct. 31, 1922.

1,434,039

UNITED STATES PATENT OFFICE.

THOMAS F. BUCK, OF NEW CASTLE, PENNSYLVANIA.

SAFETY FENDER FOR AUTOMOBILES.

Application filed May 5, 1922. Serial No. 558,616.

*To all whom it may concern:*

Be it known that I, THOMAS F. BUCK, a citizen of the United States, residing at New Castle, in the county of Lawrence and State of Pennsylvania, have invented certain new and useful Improvements in Safety Fenders for Automobiles, of which the following is a specification.

This specification relates to an automobile chassis, comprising a novel combination of a safety fender and its operating and associated members incorporated into a safety fender chassis, and has for its object the provision of a fender or bumper which ordinarily approaches the ground rather closely and which is designed to prevent a person knocked down from being run over by the wheels of the vehicle, means being provided whereby to cushion the shock to a certain extent, this latter feature being of advantage in case of a minor collision as preventing probable destruction of the fender structure.

An important object is the provision of a device of this character which is of the scoop type and which is foldable whereby to be held in raised position, as for instance when traveling over rough or stony roads, it being evident that if the fender were allowed to remain in operative position when passing over rocks and the like, it might be struck and be seriously injured or destroyed.

Another object is the provision of a fender of this character which is built onto the forward ends of the frame bars or chassis frame of an automobile and onto the mud guards of the front wheels, the latter being furthermore preferably provided with casings which form the headlights of the machine.

A further object is the provision of a safety fender which serves to strengthen the mud guards with respect to each other and the frame so as to provide a rigid structure which will prevent any sagging or looseness and consequent rattling of the guards or of the fender itself.

An additional object is the provision of a device of this character which will be comparatively simple and inexpensive in manufacture, easy to install, highly efficient in use, durable in service, and a general improvement in the art.

With the above and other objects and advantages in view, the invention consists in the details of construction to be hereinafter more fully described and claimed and illustrated in the accompanying drawings in which, Figure 1 is a side elevation showing my fender applied to an automobile, the device being in normal or operative position.

Figure 2 is a plan view with several parts omitted and broken away for the sake of clearance.

Figure 3 is a side elevation with many parts broken away and in section and showing the device in operative position.

Figure 4 is a detail section on the line 4—4 of Figure 3.

Figure 5 is a detail side elevation of one of the brackets shown in Figure 3.

Figure 6 is a front elevation thereof.

Figure 7 is a longitudinal section showing the device swung into inoperative position.

Figure 8 is a detail section on the line 8—8 of Figure 7.

Figure 9 is a detail plan view of the retaining member for the operating lever.

Figure 10 is a front elevation.

Figure 11:
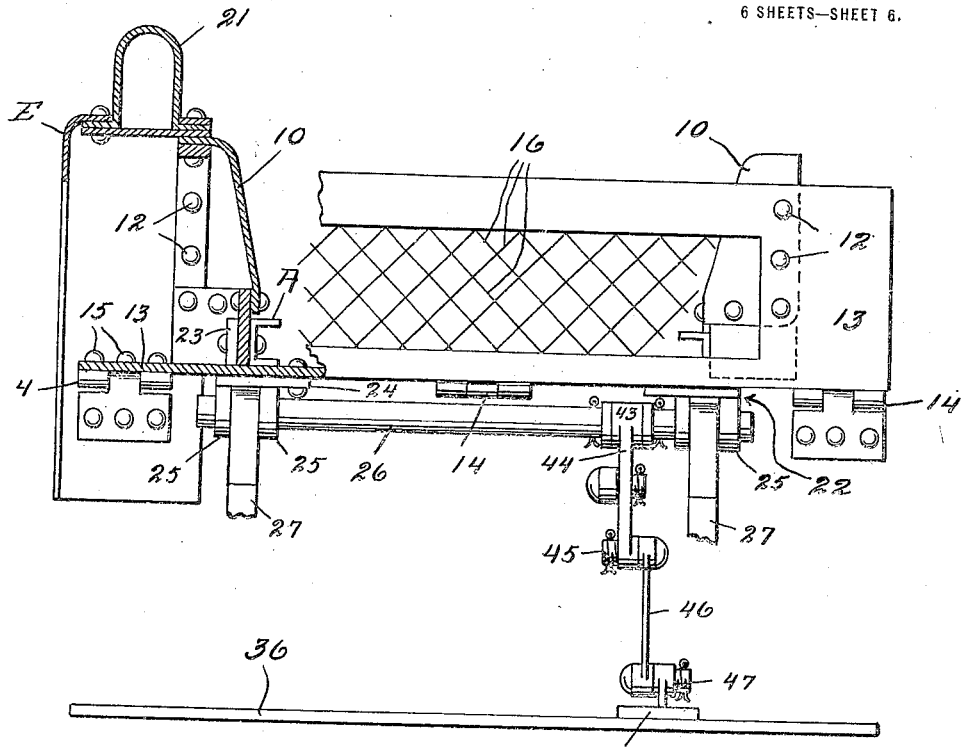
Figure 11 is a front elevation with many parts broken away and others in section.
Figure 12:
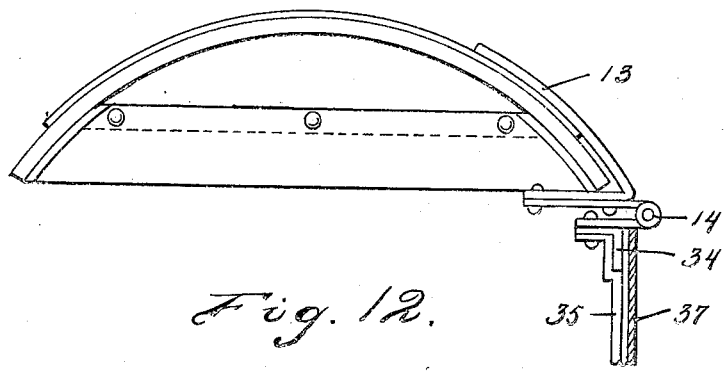
Figure 12 is a detail view of the shield structure.

Referring more particularly to the drawings, the letter A designates the side sills of an automobile frame. B designates the radiator, C the hood, D the wheels, E the mud guards which extend over the front wheels and which are connected to the running board F, said running board F being held in a longitudinal position and secured to the frame bars A by means of depending supports G riveted or bolted to said frame bars A.

In carrying out my invention I secure upon the outer side of each frame bar A a shield 10 which is semi-circular and somewhat bowl shaped, as illustrated. The members 10 are disposed at the front ends of the frame bars A and are secured to the same by means of rivets or bolts 11, or other suitable means for the fastening of the same. The outer portions of the shield members 10 underlap the inner edges of the mud guards E, and are secured thereto as by means of suitable rivets or the like 12. Secured to the outermost peripheral portions of the shields 10 at the front thereof, is a plate 13 which is arcuate in cross section and which extends laterally beyond the shields 10 as illustrated. The lower portion of the plate 13 underlaps the lower sides of the frame bars A and shields 10, as shown. At each end of the underlapped portion of the plate 13 is a leaf of a hinge 14 securely fastened thereonto by means of rivets, bolts, or the like 15. I claim the privilege of using a plurality of hinges, to be spaced equally apart, as shown in Figure 10. The plate 13 is formed with a rectangular opening in its face intermediate the mud guards E and this opening is covered by a wire netting 16, which is of the same width and length as the arcuate portion of the plate 13, although it is of course to be understood that an expanded sheet metal plate may be used if preferred.

I provide a hand rail or guard 17 which extends entirely across the front of the device at the upper edge or in line with the upper edge of the plate 13, the ends of which pass through the ornamental eye bolts 19, and terminate in knobs 18, disposed in advance of the mud guards E, as clearly illustrated in Figure 1. The members 19 pass first through the mud guards E, plate 13, and the outermost peripheral portions of the shields 10 and are held against displacement by means of a nut 20 screwed onto the same on the inner side of the shield portion, as shown in Figure 3.

The numeral 21 designates sheet-metal headlight casings which are shaped as shown, and which are secured to the highest portion of mud guards E, these lamp casings constituting the shells of the headlights of an automobile equipped with this type of safety fender. Their disposition at this particular location is desirable in view of the fact that the curved portion of the plate 13 extends upwardly to such a point as to naturally obstruct the headlights if they should be mounted at the usual location between the radiator and the mud guards. These lamp casings house all the necessary connections and parts that are needed for the successful operation of the headlights.

Disposed against the forward portions of the frame bars of the vehicle are hangers 22, each of which includes an upwardly extending attaching plate portion 23 which is formed with a hole for the passage of the securing bolt or rivet, and which further includes a forwardly extending plate portion 24 which underlaps the lower edge of the adjacent shield 10 and frame bar. Each of these hangers further includes spaced depending portions 25 through all of which passes a shaft 26 upon which are mounted the forward ends of the front springs 27 which have their rear ends mounted upon a shaft 28 which passes through elongated loops 29 formed on brackets or hangers 30 which are likewise bolted against the frame bars. The numeral 31 designates shackles for holding the front springs 27 upon the front axle, as shown. It should be stated that the hangers 22 and brackets 30 are secured to the frame by certain of the bolts or rivets 11 which are employed for the purpose of securing the shields 10 in place.

The movable portion of my device comprises a horizontally disposed angle bar 34 which extends across the front of the vehicle and to which are secured the upper ends of a plurality of curved ribs 35 which are shaped, as shown clearly in Figures 3 and 7, for engagement against the inside of the angle bar. The lower ends of the ribs 35 are curved forwardly and secured upon them is a plate or bar 36. The frame formed by the members 34, 35 and 36 is covered with a metal sheet 37 which may be steel, aluminum, copper, or the like, finished with a polished surface or enameled, or otherwise treated, as may be preferred, to have a pleasing appearance. This sheet metal covered frame constitutes the fender proper which is secured to the other leaves of the hinge members 14 so that this fender proper will be swingably mounted with respect to the stationary portion of the device. The advantage of this swingable mounting is that the fender proper may be disposed in its lower or operative position, as shown in Figures 1 and 3, or be swung upwardly into inoperative position, as shown in Figure 7. The edges of the sheet metal portion 37 are curved, as indicated at 38, to improve the appearance and to eliminate all sharp edges or corners which might cause injury to the person struck by the fender. The intermediate portion of this metal plate 37 is formed with a rectangular opening 39 covered with wire netting 40 of suitable mesh. This wire netting is of sufficient length and width to rest upon the outer sides of all of the ribs 35 and is under the sheet-metal plate, being held against displacement by the bolts or rivets 41 that hold the elements 34, 35 and 36 together. The members 34 and 37 are formed with a hole 42 which is for the purpose of permitting cranking of the engine of the vehicle in case such is necessary or desirable.

Rotatably mounted on the transverse shaft 26 is the hub portion 43 of an arm 44 upon the free end of which is pivoted, as shown at 45, a substantially semi-circular link 46 which is pivotally connected, as shown as 47, with a bracket 48 secured against the concave side of the plate 36. Formed on the arm 44 is a lateral lug 49 with which is pivotally connected, as shown at 50, a rearwardly extending reach rod 51 which is pivotally connected with the free end of an arm 52 carried by a pin 53 journaled through a depending bracket 54 bolted onto one of the frame bars A. The upper portion of this bracket is formed as a laterally extending plate member 55 having a rectangular opening 56 therein against one inner side of which is secured a leaf-spring 57. The pin 53 carries a pinion 58 which meshes with teeth 59 formed in one side of an elongated loop or frame 60 which is formed on the lower end of an operating lever 61 which passes through the opening 56 and which terminates in a loop handle 62. On one side of this lever is a projection 63 engaging upon the upper edge of the plate member 55 at one end of the opening 56 therein for the purpose of holding the operating lever in elevated position. The engagement of the leaf-spring 57 with the lever 61 holds the lever in such position that the projection 63 will properly engage upon the plate member 55.

Ordinarily, that is when the use of the fender is desired, the parts are disposed as shown in Figures 1 and 3 so that the fender proper will extend downwardly in somewhat spaced relation to the surface traveled over. At this time the operating lever 61 is in its lowermost position, as clearly disclosed in Figure 3. When the device is in this position it is readily apparent that the fender proper will operate to prevent a pedestrian knocked down from being run over by the wheels of the vehicle.

When use of the fender is either not desired or is undesirable on account of extreme roughness of the road traveled over, it is merely necessary that the operator grasp the handle 62 and pull upwardly thereupon so that the teeth 59 engage the pinion 58 and will cause rotation of the pinion and the pin 53. This rotary movement of the pin will cause forward swinging of the arm 52 and consequently forward longitudinal movement of the reach rod 51 which will then operate to swing the arm 44 upwardly into horizontal position, as shown in Figure 7. Owing to the provision of the curved link 46 the upward movement of the arm 44 will cause the fender proper to swing upwardly upon the hinges 14 so as to be disposed in reversed position entirely out of the way so that it will be impossible for it to strike against stones, stumps or any other obstructions which might happen to be in the roadway. It might be mentioned that when the device is in use and in operative position the fender proper may be used for carrying baggage and if desired, a person might stand thereon, the rail 17 providing a safe hold.

In order to provide for cushioning movement of the fender proper when it is swung downwardly into operative position, I provide a slight play or space between the leaves of the hinges 14 so that the downward swing will be free without danger of wringing off hinges. I also provide rubber headed bumping blocks 64 which are engaged by the plate 36 and which are screwed onto the outer ends of tubes 65 which are in turn screwed into supports 66 having projecting portions 67 passing underneath each front spring 27 and resting upon the top of the front axle. These projecting portions 67 are clamped firmly in place by means of the shackles or clips 31, previously described. Collars 68 are provided for preventing the bumper blocks from being punched through by the tubes 65. By this construction it will be seen that when the fender is swung down the plate 36 will engage against the bumper blocks 64 evenly and uniformly so that the shock or jar will be taken up and injury to the mechanism prevented.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention I claim:

1. A safety fender for automobiles, comprising a plate arcuate in cross section secured to the front mud guards of the vehicle and formed with an opening covered with wire screen, a fender proper formed as a downwardly and forwardly curved frame having an opening covered with wire screen, an angle bar secured to said frame, hinge members secured to said angle bar and said plate, supports depending from the vehicle frame bars, a shaft extending through said supports, an arm rotatable on said shaft, a curved link pivotally connected with said arm and pivotally connected with the rear of said frame, and lever operated means within reach of the driver for swinging said arm for controlling the position of said fender proper.

2. A safety fender for automobiles comprising a curved plate secured to the front mud guards, a downwardly and forwardly curved fender proper hinged upon the lower edge of said plate, a pair of supports depending from the frame bars of the vehicle, a shaft passing through said supports, an arm pivoted on said shaft, a curved link pivotally connected with said arm and with the rear side of the fender proper, lever operated means within reach of the driver for swinging said arm to swing the fender proper into operative or inoperative position, and rubber bumpers projecting forwardly in position to be engaged by the fender proper for cushioning the downward swinging thereof.

3. A safety fender for automobiles comprising a curved plate secured to the front mud guards, a downwardly and forwardly curved fender proper hinged upon the lower edge of said plate, a pair of supports depending from the frame bars of the vehicle, a shaft passing through said supports, an arm pivoted on said shaft, a curved link pivotally connected with said arm and with the rear side of the fender proper, lever operated means within reach of the driver for swinging said arm to swing the fender proper into operative or inoperative position, said means comprising a rocker arm carrying a pinion, a reach rod pivotally connected with said rocker arm and said first named arm and a vertically movable rack member engaging said pinion.

4. A safety fender for automobiles comprising a curved plate secured to the front mud guards, a downwardly and forwardly curved fender proper hinged upon the lower edge of said plate, a pair of supports depending from the frame bars of the vehicle, a shaft passing through said supports, an arm pivoted on said shaft, a curved link pivotally connected with said arm and with the rear side of the fender proper, lever operated means within reach of the driver for swinging said arm to swing the fender proper into operative or inoperative position, said means comprising a bracket secured upon one frame bar, a shaft journaled through said bracket and carrying a pinion, an arm on said last named shaft, a reach rod pivotally connected with both of said arms, a vertically movable lever slidable through said bracket and provided with a handle, and rack teeth on said lever engaging said pinion.

5. A safety fender for automobiles comprising a support secured transversely upon the front mud guards, a downwardly extending finger proper hinged upon said support, a transverse shaft mounted below the frame bars, an arm pivoted at one end upon said shaft, a substantially semicircular link pivotally connected with the free end of said arm and with the rear side of the fender proper, a bracket secured upon one frame bar in advance of the driver's seat, a pinion journaled upon said bracket and carrying an arm, a reach rod pivotally connected with both arms, a lever slidably mounted through said bracket and having its upper end provided with a handle, the lower end of said lever being formed as a loop having one side toothed and meshing with said pinion, and spring operated catch means normally holding said lever at one limit of its movement.

6. A safety fender for automobiles comprising a plate member secured to the forward portions of the front mud guards, a hand rail carried by said plate member and extending entirely across the front of the vehicle, a forwardly and downwardly curved fender proper hinged upon the lower edge of said plate member and normally approaching the ground, the lower portion of said fender proper serving as a platform upon which a person may ride and upon which baggage may be disposed, means for swinging said fender proper into operative or elevated position, and a pair of arms extending forwardly from the front axle and terminating in resilient bumpers engageable by the rear side of the fender proper when the fender proper is swung downwardly into operative position, whereby to cushion the shock of such movement.

In testimony whereof I hereto affix my signature.

THOMAS F. BUCK.

Certificate of Correction.

It is hereby certified that in Letters Patent No. 1,434,039, granted October 31, 1922, upon the application of Thomas F. Buck, of New Castle, Pennsylvania, for an improvement in "Safety Fenders for Automobiles," an error appears in the printed specification requiring correction as follows: Page 4, line 40, claim 5, for the word "finger" read *fender;* and that the said Letters Patent should be read with this correction therein that the same may conform to the record of the case in the Patent Office.

Signed and sealed this 28th day of November, A. D., 1922.

[SEAL.]
KARL FENNING,
*Acting Commissioner of Patents.*